Patented Nov. 30, 1948

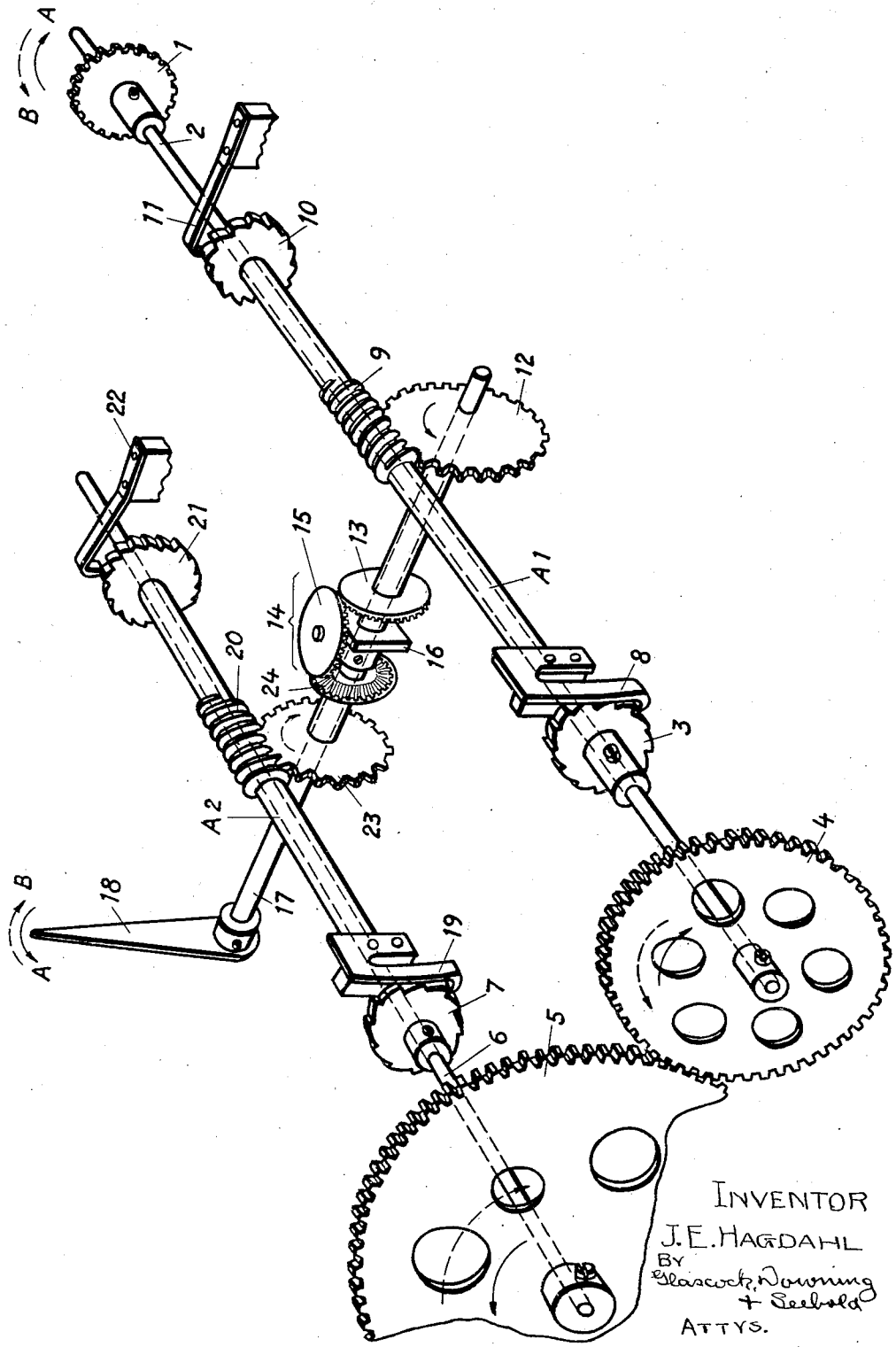

2,455,056

UNITED STATES PATENT OFFICE 2,455,056

ACCUMULATOR METER

John Ernst Hagdahl, Stockholm, Sweden, assignor to Telefonaktiebolaget L M Ericsson, Stockholm, Sweden, a company of Sweden Application September 11, 1944, Serial No. 553,646
In Sweden November 16, 1943

5 Claims. (Cl. 171—34)

Accumulator meters of the type in which a pointer, being driven by an energy meter, rotates in one direction when the battery is charged and in the other when it is discharged, shows the inconvenience that because of the losses in the battery, the pointer will not be brought back to its zero position after discharge of the same number of ampere hours with which the battery has been charged earlier. In order to eliminate this inconvenience many solutions have been proposed. For instance it has been proposed to switch-in a resistance in the rotor circuit when the rotor of the meter rotates in one direction so that the speed of rotation of the rotor disc in the different directions will be different. On account of the rather great rotor currents (about 10 amperes) it is, however, difficult to break these circuits.

One object of the invention is to eliminate these inconveniences and the invention is characterized thereby that the rotor of the energy meter is arranged to drive the pointer by means of a transmission device arranged in such a way that an arbitrary value can be given to the relation between the velocities of the pointer in the different directions of rotation. In the accompanying drawing the figure illustrates in perspective an embodiment of the invention. The movement of the energy meter is by means of the toothed wheel 1 transmitted to the shaft 2 and to the ratchet wheel 3 and the toothed wheel 4 connected to the shaft, the toothed wheel being in engagement with the wheel 5 which in its turn transmits the movement to the shaft 6 and the ratchet wheel 7. The shafts 2 and 6 extend through the pipe shafts A1 and A2 respectively, on which the worm wheels 9 and 20, respectively, and the click springs 8 and 19, respectively, and the ratchet wheels 10 and 21, respectively, are fixedly arranged, the ratchet wheels 10 and 21 cooperating with the fixedly arranged spring pawls 11 and 22, respectively. Each of the worms 9 and 20 are in engagement with its worm wheel 12 and 23, respectively, each of the last mentioned wheels being connected to its sun wheel 13 and 24, respectively, in the differential 14, the planet wheel 15 of which transmits the movement to the pointer 18 mounted on the shaft 17. On the direction of rotation "A" of the toothed wheel 1 and the shaft 2, which direction is supposed to correspond to discharge, the ratchet wheel 3 drives the spring pawl 8 and the pipe shaft A1 connected to same and provided with the worm 9 and the ratchet wheel 10. The worm 9 drives the worm wheel 12 and the sun wheel 13 connected to same in the direction of the arrow. The hub 16 carrying the planet wheel 15 will thereby rotate and the shaft 17 transmits a rotatory motion to the pointer 18 in the direction of the arrow. During the movement of the shaft 2 a movement is transmitted over the gear 4, 5 to the shaft 6 and the rachet wheel 7 which tends to impart its movement to the spring pawl 19, the worm 20 and the ratchet wheel 21, this movement however being stopped in this direction by the spring pawl 22. The bearing edge of the spring pawl 19 is then deflected by the teeth of the ratchet wheel 7, the worm 20 and the ratchet wheel 21 thus will remain still at the rotation of the toothed wheel 1 in the direction "A."

When the meter drives the shaft 2 and the wheel 1 in the direction of the dashed arrow, which corresponds to charging of the battery, the ratchet wheel 7 will instead drive the spring pawl 19, the pipe shaft A2, the worm wheel 20 and the ratchet wheel 21 in the direction of the dashed arrow, the teeth of the spring pawl 22 thereby being lifted by the teeth of the ratchet wheel 21. No movement of the pipe shaft A1, the spring pawl 8, the worm wheel 9 will in this case take place since the ratchet wheel 10 is stopped by the spring pawl 11. No movement from one sun wheel to the other can be transmitted, the worms being constructed so as to form an irreversible drive.

The device described thus makes it possible that the velocity of the pointer when charging the battery is smaller than when discharging it and that an arbitrary value can be given to the relation of the velocities of rotation of the pointer in different directions of rotation.

I claim:

1. Accumulator meter device comprising an energy meter, a pointer and a mechanical transmission device for transmitting movement of the meter rotor to the pointer in accordance with the direction of the rotation of said rotor, said transmission device comprising a differential gear, one of the three movable members of which being connected to the shaft of said pointer, two shafts, each carrying a gear element designed to drive one of the two remaining movable elements of said differential gear, separate means for stopping the rotation of each of said shafts in one direction, two further shafts, each carrying a gear wheel, said two wheels meshing with one another, one of said last mentioned shafts being driven by said rotor, and in turn designed to drive one of said first mentioned two shafts in one direction only by means of a clutch, the second of said last mentioned shafts being designed to drive the other of said first mentioned shafts in one direction only by means of a second clutch.

2. Accumulator meter device comprising an energy meter, a pointer and a mechanical transmission device for transmitting movement of the meter rotor to the pointer in accordance with the direction of the rotation of said rotor, said transmission device comprising a differential gear, one of the three movable members of which being connected to the shaft of said pointer, two shafts, each carrying a gear element being designed to drive one of the two remaining movable elements of said differential gear, separate means for stopping the rotation of each of said shafts in one direction, two further shafts, each carrying a gear wheel, said two wheels meshing with one another and each being exchangeably mounted on said shaft, one of said last mentioned shafts being driven by said rotor, and in turn designed to drive one of said first mentioned two shafts in one direction only by means of a clutch, the second of said last mentioned shafts being designed to drive the other of said first mentioned shafts in one direction only by means of a second clutch.

3. Accumulator meter device comprising an energy meter, a pointer and a mechanical transmission device for transmitting movement of the meter rotor to the pointer in accordance with the direction of the rotation of said rotor, said transmission device comprising a differential gear, one of the three movable members of which being connected to the shaft of said pointer, two pipe shafts, each carrying a gear element being designed to drive one of the two remaining movable elements of said differential gear, separate means for stopping the rotation of each of said shafts in one direction, two further shafts, each passing through one of said pipe shafts, each carrying a gear wheel, said two wheels meshing with one another, one of said last mentioned shafts being driven by said rotor, and in turn designed to drive one of said first mentioned pipe shafts in one direction only by means of a clutch, the second of said last mentioned shafts being designed to drive the other of said first mentioned pipe shafts in one direction only by means of a second clutch.

4. Transmission device for transmitting movement from a driving shaft to a driven shaft in accordance with the direction of rotation of said driving shaft, comprising a differential gear including three movable members, one of said members being connected to said driven shaft, two gear elements each operable to drive one of the two remaining movable members of said differential gear, two intermediate shafts carrying the gear elements, separate means for stopping the rotation of each of said intermediate shafts in one direction, two gear wheels meshing with one another, one of said gear wheels being driven by said driving shaft, a clutch, said driving shaft driving one of said two intermediate shafts in one direction only by said clutch, a second clutch, the second of said two gear wheels driving the other of said intermediate shafts in one direction only by means of said second clutch.

5. A transmission device as claimed in claim 4 wherein said intermediate shafts are of tubular form and mounted on the drive and driven shafts.

JOHN ERNST HAGDAHL.

REFERENCES CITED

The following references are of record in the file of this patent:

UNITED STATES PATENTS

| Number | Name | Date |
| --- | --- | --- |
| 769,988 | Duncan | Sept. 13, 1904 |
| 1,923,347 | Willis | Aug. 22, 1933 |